US005436435A

United States Patent [19]
McMillan

[11] Patent Number: 5,436,435
[45] Date of Patent: Jul. 25, 1995

[54] AUTOMATED FINANCIAL SYSTEM

[75] Inventor: David J. McMillan, Glasgow, Scotland

[73] Assignee: NCR Corporation, Dayton, Ohio

[21] Appl. No.: 154,570

[22] Filed: Nov. 19, 1993

[30] Foreign Application Priority Data

Sep. 16, 1993 [GB] United Kingdom ................. 9319180

[51] Int. Cl.[6] ................................................ G06K 7/10
[52] U.S. Cl. ........................................ 235/379; 902/10
[58] Field of Search ............................ 235/379; 902/10

[56] References Cited

U.S. PATENT DOCUMENTS

| | | | |
|---|---|---|---|
| D. 314,076 | 1/1991 | Tarkany et al. | D99/28 |
| 3,949,364 | 4/1976 | Clark et al. | 902/10 X |
| 3,964,577 | 6/1976 | Bengtsson | 902/10 X |
| 4,059,246 | 11/1977 | Anders et al. | 902/10 X |
| 4,398,088 | 8/1983 | Hirose et al. | 235/379 |
| 4,411,336 | 10/1983 | Anders | 902/10 X |
| 4,552,350 | 11/1985 | Nagy et al. | 271/3 |
| 4,564,122 | 1/1986 | Granzow et al. | 221/12 |
| 4,577,763 | 3/1986 | Placke et al. | 209/534 |
| 4,578,009 | 3/1986 | Granzow et al. | 414/43 |
| 4,620,087 | 10/1986 | Aizaki | 235/379 |
| 4,624,359 | 11/1986 | Gross | 198/366 |
| 4,638,434 | 1/1987 | Aizaki | 235/379 X |
| 4,697,708 | 10/1987 | Goto et al. | 902/10 X |
| 4,754,126 | 6/1988 | Caldwell | 235/379 |
| 4,775,783 | 10/1988 | Sasaki et al. | 235/379 |
| 4,816,652 | 3/1989 | Wildgoose et al. | 235/379 |
| 4,866,254 | 9/1989 | Okayama et al. | 235/379 |
| 4,980,543 | 12/1990 | Hara et al. | 235/379 |

*Primary Examiner*—Donald Hajec
*Assistant Examiner*—Michael G. Lee
*Attorney, Agent, or Firm*—Albert L. Sessler, Jr.

[57] ABSTRACT

An automated financial system (6) includes a plurality of wall-mounted user interface units (10, 12, 14) and a central module system (8), including a plurality of modules (40, 42, 46, 48) such as may be employed in a conventional ATM, located in a safe area remote from the interface units (10, 12 or 14). A track (20) connects each interface unit (10, 12 or 14) to the central module system (8). A motor-driven carriage (24) rides on each track (20) and has a cassette (26) fixed thereto, which is capable of carrying currency or other media between the respective interface unit (10, 12 or 14) and the central module system (8). A receptacle (18) for holding small amounts of currency is associated with each interface unit (10, 12 or 14) for supplying small amounts of currency to a user without the need for obtaining such currency from the central module system (8). A central track (32) with a carriage-mounted cassette (38) thereon is associated with the central module system (8), this cassette (38) having the capability of transferring media to, or receiving media from, one of the other cassettes (26).

28 Claims, 3 Drawing Sheets

AUTOMATED FINANCIAL SYSTEM

BACKGROUND OF THE INVENTION

The present invention relates to an automated financial system.

Automated teller machines (ATMs) have come into increasing use in recent years because of the convenience to customers of providing fast efficient service at a large number of locations and because of the economic advantage which they provide to financial institutions in enabling a reduction of staffing requirements.

Since automated teller machines are relatively large, complex machines, any arrangement which reduces their overall purchase and maintenance costs is highly desirable. In addition, any arrangement which reduces the vulnerability of automated teller machines to criminal activity, such as "ram raiding", in which a machine may be rammed by a vehicle to obtain access to its currency supply, would be highly desirable.

SUMMARY OF THE INVENTION

According to the invention there is provided an automated financial system for carrying out financial transactions, including a plurality of user interface units each including apertures for receiving and dispensing media, and entry means for determining the type of transaction to be made by a user, characterized by a central module system remote from said interface units and including an array of modules each arranged to receive or dispense specific media, and a plurality of media transport devices respectively associated with said interface units, each transport device being arranged to move back and forth along a predetermined path between the respective interface unit and said central module system for carrying media from said central module system to the respective interface unit and vice versa.

It is accordingly an object of the present invention to provide an automated financial system which is of reduced cost.

Another object of the invention is to provide an automated financial system which provides enhanced security against "ram raiding" criminal activity.

Another object is to provide an automated financial system which includes a plurality of user interface units and a remote central modular system.

Another object is to provide an automated financial system having a reduced cost because of the use of a single remote central modular system in combination with a plurality of user interface units.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
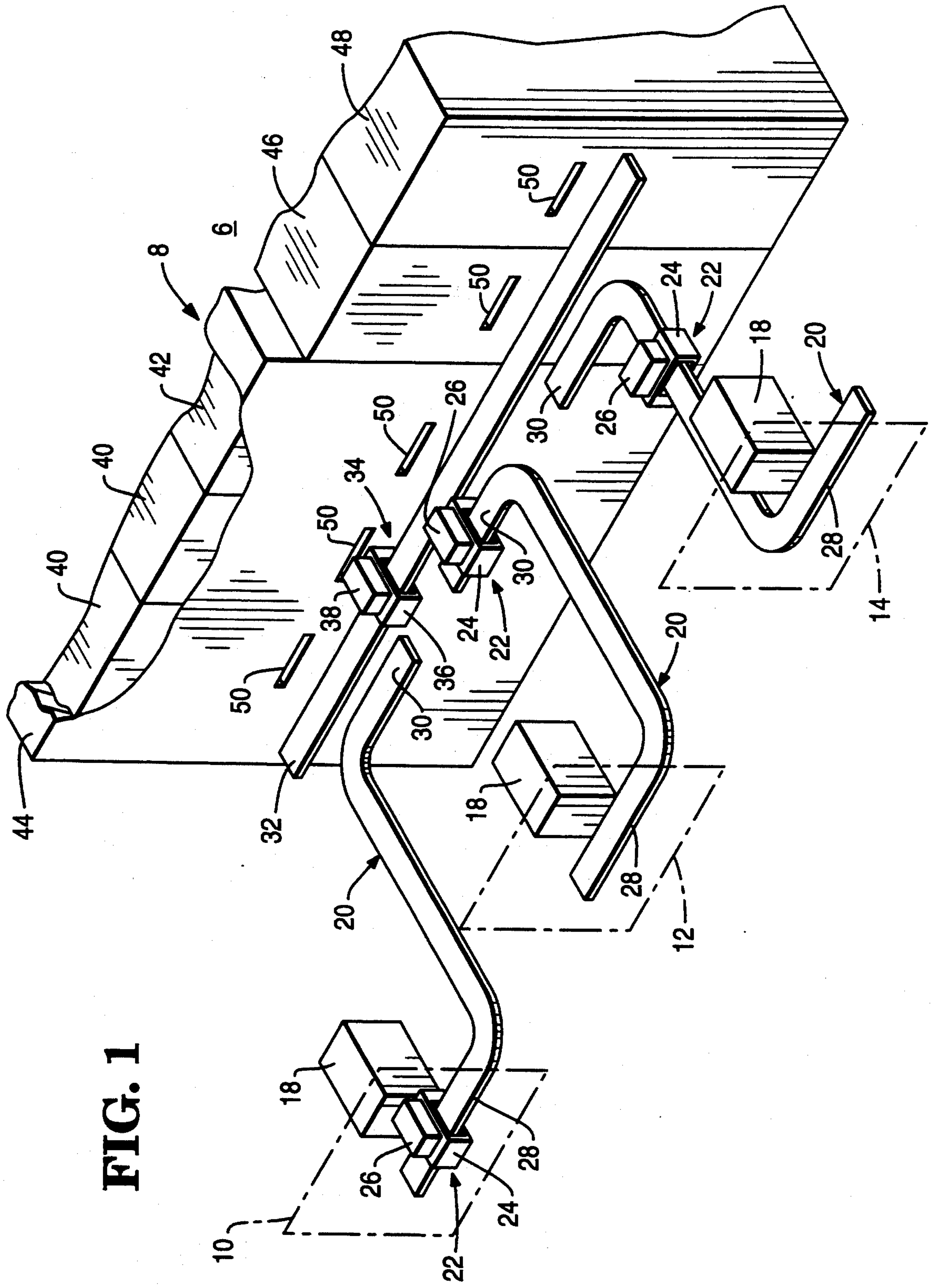
FIG. 1 is a diagrammatic perspective view of a system in accordance with the present invention.

As shown in FIG. 1, an automated financial system 6 includes a central module system 8 and a plurality (three, in the illustrated embodiment) of ATM fascias, or user interface units, 10, 12 and 14, which are mounted in an exterior wall 16 (FIG. 2) of the financial institution in which the system 6 is installed. Associated with each customer interface unit 10, 12 or 14 is a security receptacle 18, in which a relatively small quantity of pre-counted bundles of currency notes may be stored, to facilitate withdrawal by users of small amounts of cash without the necessity for transporting currency from the central module system 8 to the interface units 10, 12 and 14. Each receptacle 18 includes actuating means (not shown) for use in transferring a bundle of currency notes into and out of the receptacle 18.

Transportation of media (which henceforth in this description will be understood to include currency notes, envelopes and printed statements) between the central module system 8 and the interface units 10, 12 and 14 is accomplished by use of a plurality of tracks 20, on each of which is mounted for movement therealong a device 22, which comprises a carriage 24 to which is attached a cassette 26 in which media of various types may be contained and carried. Each carriage 24 and the associated track 20 are constructed to act as a linear motor whereby the carriage 24 may be driven along the track 20 to a selected position by appropriate energization of the track 20. It should be understood that a linear motor has the advantages of being accurate and fast in operation.

Each of the tracks 20 has a first straight portion 28 which is positioned adjacent to the receptacle 18 for each interface unit 10, 12 or 14 in order to facilitate transfer of bundles of currency notes between the associated cassette 26 and the relevant receptacle 18. Also, as will be described later with reference to FIG. 2, each cassette 26 can be arranged to be positioned adjacent to deposit, cash withdrawal, statement and envelope slots in the associated interface units 10, 12 and 14 in order to permit the transfer of media between the cassette 26 and a user through the respective slots.

Each of the tracks 20 also has a second straight portion 30 which is positioned adjacent to and parallel with a central track 32 forming part of the central module system 8. Mounted for linear movement on the track 32 is a central transport device 34 which comprises a carriage 36 to which is attached a cassette 38. In a similar manner to the carriages 24 and the tracks 20, the carriage 36 and the track 32 are constructed to act as a linear motor whereby the carriage 36 may be driven to a selected position on the track 32 by appropriate energization of the track 32.

In the illustrated embodiment of the invention, the central module system 8 includes five modules consisting of two cash dispensers 40 and a depository 42 which are housed in a safe 44, together with a statement printer 46 and an envelope dispenser 48. The module system 8 is provided with five horizontally aligned slots 50 via which media transfer can take place to or from the respective five modules 40, 42, 46, 48. The track 32 is mounted adjacent to the modules 40, 42, 46, 48 in such a position that the transport device 34 can be moved on the track 32 to a position in which the cassette 38 is in cooperative relationship with a selected one of the slots 50.

The cassettes 26 and the cassette 38 are so designed as to be able to pass media back and forth from cassette to cassette or from cassette to another element of the system 6. Movement of media into and out of a cassette 26 or 38 when located at a particular position on the associated track 20 or 32 is controlled by a respective control means 51 (FIG. 3) located adjacent that position and arranged to cooperate with actuating means (not shown) included in cassette 26 or 38, with power for the actuating means being supplied via the associated track 20 or 32. Each control means 51 could, for example, be formed by an infra-red control device which cooperates in a contactless manner with the actuating means of the corresponding cassette 26 or 38. When the cassette 38 of the central transport device 34 is positioned in cooperative relationship with the slot 50 associated with one of the modules 40, 46 and 48, the cassette 38 can receive media from the relevant module 40, 46 or 48 through the slot 50. The transport device 34 and an appropriate one of the transport devices 22 are then moved to positions in which the corresponding cassettes 38 and 26 are in cooperative relationship with each other, whereupon the media contained in the cassette 38 is transferred to the cassette 26. When this transfer is completed, the device 22 is moved along the corresponding track 20 to a position in which the cassette 26 is in cooperative relationship with the appropriate slot in the corresponding interface unit 10, 12 or 14, the media contained in the cassette 26 then being transferred to the user.

In an alternative mode of operation, if a user transaction is a cash withdrawal of a commonly requested currency amount and a currency note bundle for that amount is contained in the corresponding receptacle 18, then instead of proceeding to the central module system 8 for collection of cash from one of the cash dispensers 40, the relevant transport device 22 moves to a position in which the associated cassette 26 is in cooperative relationship with the receptacle 18. A bundle of currency notes representing the requested amount of cash is then transferred from the receptacle 18 to the cassette 26, this bundle thereafter being transferred to the user via the cash withdrawal slot in the relevant interface unit 10, 12 or 14. It should be understood that during periods of low user activity in respect of the system 6, each receptacle 18 can be replenished with bundles of currency notes obtained from one of the cash dispensers 40 and transferred to the receptacle 18 by the cassette 26 of the relevant transport device 22.

A reverse procedure is employed when a user wishes to deposit an envelope containing cash or checks into the financial system 6. The cassette 26 associated with one of the interface units, say unit 12, is moved by its carriage 24 along the track 20 on to the straight portion 28 and is positioned in cooperative relation with the depository slot of the interface unit 12. When the deposit is made, the relevant transport device 22 is moved along the associated track 20 to a position on the straight portion 30 in which the cassette 26 is in cooperative relationship with the cassette 38 of the transport device 34, the device 34 having previously been moved along the track 32 to place it in the correct position. The deposited envelope is then passed from the cassette 26 to the cassette 38, after which the carriage 36 is moved on the track 32 to a position in which the cassette 38 is placed in cooperative relationship with the slot 50 associated with the depository 42. The envelope is then passed from the cassette 38 through the slot 50 into the depository 42 located within the safe 44.

Figure 2:
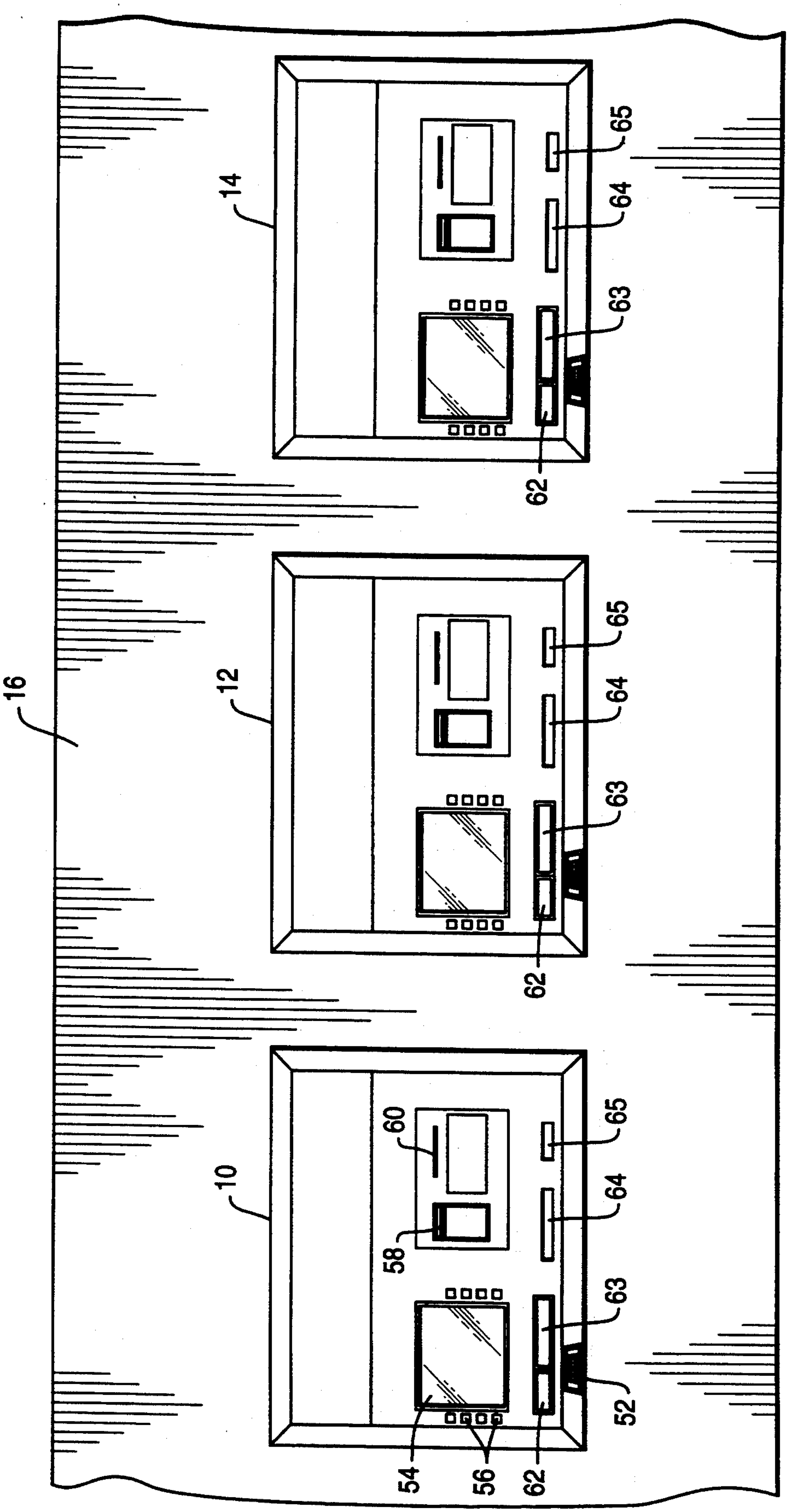
FIG. 2 is an elevation view showing three wall-mounted user interface units.

Shown in FIG. 2 are typical user interfaces for the customer interface units 10, 12 and 14. Each of these units typically includes a numeric keyboard 52, a display 54 with associated control keys 56 for a user lead-through operation, a user account card reader slot 58, a slot 60 through which a printed record (receipt) of a transaction is presented to a user, a depository slot 62 through which a user can deposit an envelope containing currency and/or checks, a currency dispenser slot 63 through which currency notes are presented to a user as part of a withdrawal transaction, a statement slot 64 through which a printed statement relating to a user's account is presented to the user on request, and an envelope slot 65 through which an empty envelope is presented to a user for his use in making a deposit. The operation of each user interface unit 10, 12 or 14 is conventional, and accordingly will not be described further.

The main difference between the layout of the various elements of the interface units 10, 12 and 14 and the layout of corresponding elements of known ATMs is that the slots 62, 63, 64 and 65 of each of the units 10, 12 and 14 are all aligned horizontally in order to facilitate the transfer of media between the slots and the associated transport device 22. Depending on whether a user transaction is a deposit, a cash withdrawal, a request for a statement or a request for an envelope, the relevant transport device 22 is moved to a position in which the associated cassette 26 is positioned adjacent the relevant slot 62, 63, 64 or 65 to enable the desired media transfer to take place between the user and the cassette 26.

It should be understood that each of the interface units 10, 12 and 14 includes a receipt printer (not shown) for printing and issuing transaction receipts through the slot 60, and a card reader (not shown) for reading account information from an account card inserted by a user through the slot 58.

Figure 3:
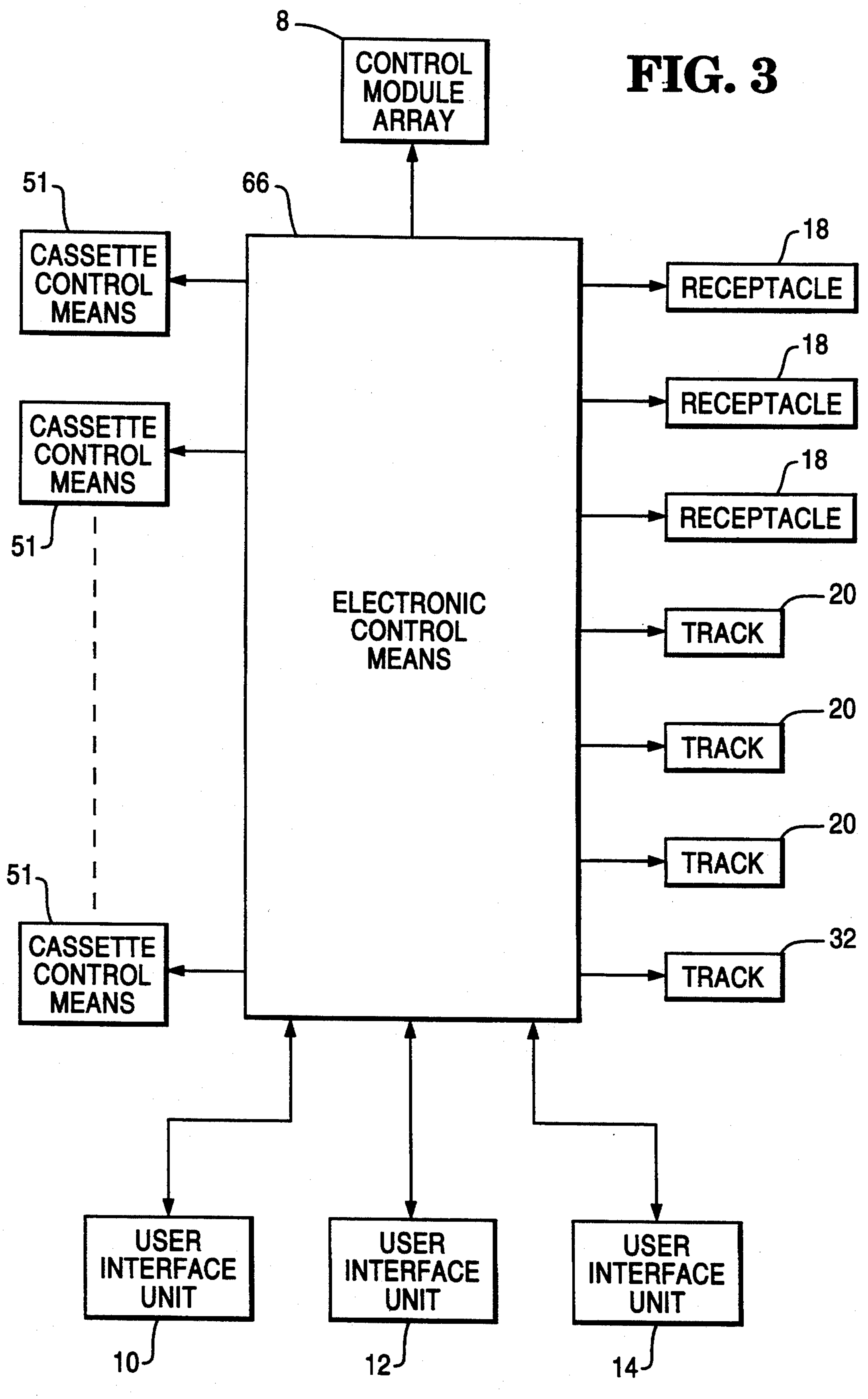
FIG. 3 is a block diagram showing the interconnections for control purposes of the various elements of the system.

The manner in which the various elements of the system are controlled is shown generally in FIG. 3. The user interface units 10, 12 and 14 and the central module system 8 are coupled electronically to an appropriately programmed electronic control means 66. The control means 66 controls various media receiving and dispensing mechanisms in the central module system 8 and various elements of the interface units 10, 12 and 14, as well as the movement of the devices 22 and 34 on the tracks 20 and 32, respectively, and the operation of the cassettes 26 and 38 and the receptacles 18 in transferring media to and from them. Operation of the control means 66, in turn, is dependent on input data entered by users in initiating various types of transactions.

It will be seen that the selection by a user of a desired transaction and the entry of other information such as his personal identification number PIN, using the keyboard 52 and the keys 56 is communicated from the user interface unit 10, 12 or 14 to the electronic control means 66. The electronic control means 66, together with the various cassette control means 51 controlled by the control means 66, then cause the necessary operating sequence of the system 6 to take place, including the necessary positioning of the devices 22 and 34 on their respective tracks 20 and 32 by appropriate energization of the tracks, and the transfer of media as necessary between the selected interface unit 10, 12 or 14 and the appropriate cassette 26, between the cassette 26 and the cassette 38, between the cassette 38 and the appropriate module 40, 42, 46 or 48 of the central module system 8, and, if required, between the cassette 26 and the associated receptacle 18.

It should be understood that by virtue of the fact that the three interface units 10, 12 and 14 share between them only two cash dispensers, and only one statement printer and one envelope dispenser, a considerable saving in hardware costs is achieved compared with three separate ATMs providing the same functions as the system 6. A further advantage of the system 6 is that by virtue of the provision of the receptacles 18 a considerable reduction in transaction time is achieved in respect of a significant number of cash withdrawal transactions. Another advantage of the system 6 is that by virtue of the fact that the cash dispensers 40 (which contain most of the cash held in the system 6) are located in an area remote from the exterior wall 16 of the financial institution, there is significantly enhanced security against "ram raiding" criminal activity.

In an alternative arrangement to that described above, the tracks 20 and 32 and the carriages 24 and 36 could be replaced by tubes, with each cassette 26 being mounted for movement along a respective one of the tubes, and with compressed air serving as the propulsion means.

Although the invention has been described with particular reference to a preferred embodiment thereof, variations and modifications of the present invention can be effected within the spirit and scope of the following claims.

What is claimed is:

1. An automated financial system, comprising:

a plurality of interface units each including apertures for receiving and delivering media and entry devices for determining the type of transaction to be made;

a central module system remote from the interface units and being capable of maintaining a store of media;

a plurality of tracks extending between the central module system and each of the interface units; and a media transport device mounted in each path for movement back and forth between an interface unit and the central module system for carrying media from the central module system to an interface and vice versa;

the central module system including a plurality of ports associated with each track for a given interface unit, at least one of said ports being an input port provided for receiving media from an associated interface unit, and at least another of said ports being an output port provided for outputting media for delivery to an associated interface unit;

the central module system including a central track and a central transport device movable on said central track from one port to another for cooperating with media transport devices on the tracks associated with the interface units for transferring media.

2. The automated financial system of claim 1, in which the central transport device comprises a carriage mounted on said central track and a media cassette attached to said carriage.

3. The automated financial system of claim 2, in which said carriage of the central transport device is motor-driven.

4. The automated financial system of claim 1, in which each media transport device comprises a carriage mounted for movement on the track and a media cassette attached to said carriage.

5. The automated financial system of claim 4, in which said carriage is motor-driven.

6. The automated financial system of claim 1, in which the central track is disposed along a straight line, and a portion of each of the interface tracks runs parallel to the central track.

7. The automated financial system of claim 6, in which certain portions of the central track are located adjacent to the ports of the central module system.

8. The automated financial system of claim 1, in which each interface unit is electronically coupled to said central module system for initiating user transactions.

9. The automated financial system of claim 1, in which each interface unit includes a first opening through which media can be deposited by the user; a second opening through which media can be dispensed by the system to a user; a third opening through which a printed record of a transaction can be provided to a user; a keyboard for entering numerical data relating to a transaction by a user; an entry device for determining the type of transaction to be made by the user; and a device for reading an account card on which user account information is stored.

10. The automated financial system of claim 1, in which said media includes currency.

11. The automated financial system of claim 1, in which the media transport device for each interface unit is positioned on its respective track adjacent to the interface unit at the beginning of a user transaction at said interface unit.

12. The automated financial system of claim 11, in which each track extending between an interface unit and the central module system includes a straight portion adjacent to the interface unit on which the respective media transport device is positioned at the beginning of a user transaction.

13. An automated financial system, comprising:

a plurality of interface panels located on user-accessible surfaces;

a central module system located at a position remote from said plurality of interface panels, said central module system having the capability to store media which is safeguarded against unauthorized removal by its distance from said interface panels; and means for transporting media between said interface panels and said central module system under control of transactions initiated by users at said interface panels, comprising a plurality of tracks, one such track extending between said central module system and each interface panel, and also comprising a media transport means operating on each of said tracks for transporting media back and forth between a respective interface panel and the central module system;

said central module system including a central track and a central transport device movable on said track to cooperate with the media transport means on said other tracks for transporting media back and forth between a respective interface panel and the central module system.

14. The automated financial system of claim 13, also including receptacle means associated with each interface panel and adjacent thereto for holding a small media supply for dispensing to users.

15. The automated financial system of claim 13, in which said media includes currency.

16. An automated financial system for carrying out financial transactions, comprising:

a plurality of user interface units, each including apertures for receiving and dispensing media;

entry means for determining the type of transaction to be made by a user;

a central module system remote from said interface units and including a plurality of modules each arranged to receive or dispense specific media; and a plurality of media transport devices respectively associated with said interface units, each transport device being arranged to move back and forth along a predetermined path between the respective interface unit and said central module system for carrying media from said central module system to the respective interface unit and vice versa, said media transport devices being respectively mounted on a plurality of tracks for movement therealong, each track extending between said central module system and a respective one of said interface units;

said central module system including a central track associated with said modules, and a central media transport device mounted on said central track for movement therealong, said central media transport device being arranged to be movable into cooperative relationship with any one of said modules and with any one of the other media transport devices, whereby media may be transferred between a selected interface unit and a selected module via the media transport device associated with the selected interface unit and via said central media transport device.

17. The automated financial system of claim 16, in which said central track is disposed along a straight line, and in which a portion of each of the tracks associated with said interface units runs parallel to said central track.

18. The automated financial system of claim 16, in which each media transport device is arranged to be driven along the respective track by an associated motor.

19. The automated financial system of claim 18, in which each motor is a linear motor of which the respective track forms a part.

20. The automated financial system of claim 16, in which each media transport device comprises a carriage mounted for movement on the respective track and a media cassette fixed to said carriage.

21. The automated financial system of claim 16, also including a plurality of receptacles respectively associated with said interface units, each receptacle being arranged to hold a store of pre-counted bundles of currency notes from which store an appropriate bundle may be dispensed on request to a user at the associated interface unit.

22. The automated financial system of claim 21, in which a pre-counted bundle of currency notes is arranged to be transferred from a selected receptacle to the associated interface unit via the associated media transport device.

23. The automated financial system of claim 16, in which those apertures of each interface unit which are in communication with said central module system via the associated media transport device are aligned horizontally.

24. The automated financial system of claim 16, in which each interface unit includes a device for reading an account card on which user account information is stored, and print means for providing a printed record of a transaction to a user.

25. The automated financial system of claim 16, in which at least one of said modules is a cash dispenser.

26. A method for performing self-service user transactions involving the depositing or dispensing of media using a financial system having an interface panel, a small media supply at the interface panel, a remotely central module system for a larger media supply at the central module system and a motor-driven transport device movable between said interface panel and said central module system, comprising the following steps:

(a) locating the motor-driven transport device adjacent to the interface panel at the beginning of a transaction;

(b) initiating a transaction by said user;

(c) in the case of a small media dispensing transaction, providing media from the small media supply at the interface panel to the user;

(d) in the case of a larger media dispensing transaction, sending the motor-driven transport device to the central module system and back to the interface panel to provide the larger media to be dispensed to the user; and (e) in the case of a user media deposit, loading the deposit into the motor-driven transport device and sending said motor-driven transport device to said central module system to deposit said media there.

27. The method of claim 26, in which the central module system includes a central track and a central movable transport device on said track, and in which step (d) includes transferring larger media from the central movable transport device to said motor-driven transport device, and in which step (e) includes transferring media from said motor-driven transport device to said central movable transport device.

28. The method of claim 26, in which the providing and depositing of media includes currency.

* * * * *